United States Patent
Bertone et al.

(10) Patent No.: US 7,099,913 B1
(45) Date of Patent: Aug. 29, 2006

(54) SPECULATIVE DIRECTORY WRITES IN A DIRECTORY BASED CACHE COHERENT NONUNIFORM MEMORY ACCESS PROTOCOL

(75) Inventors: Michael S. Bertone, Framingham, MA (US); Richard E. Kessler, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1236 days.

(21) Appl. No.: 09/652,834

(22) Filed: Aug. 31, 2000

(51) Int. Cl.
G06F 15/16 (2006.01)
G06F 12/00 (2006.01)
G06F 9/26 (2006.01)

(52) U.S. Cl. .................. 709/202; 711/204; 711/118
(58) Field of Classification Search ............... 709/400; 711/204
See application file for complete search history.

(56) References Cited

U.S. PATENT DOCUMENTS

| | | | |
|---|---|---|---|
| 5,261,066 A | 11/1993 | Jouppi et al. | 395/425 |
| 5,317,718 A | 5/1994 | Jouppi | 395/425 |
| 5,758,183 A | 5/1998 | Scales | 395/825 |
| 5,761,729 A | 6/1998 | Scales | 711/148 |
| 5,787,480 A | 7/1998 | Scales et al. | 711/148 |
| 5,802,585 A | 9/1998 | Scales et al. | 711/154 |
| 5,809,450 A | 9/1998 | Chrysos et al. | 702/186 |
| 5,875,151 A | 2/1999 | Mick | 365/233 |
| 5,890,201 A | 3/1999 | McLellan et al. | 711/108 |
| 5,893,931 A | 4/1999 | Peng et al. | 711/206 |
| 5,895,484 A * | 4/1999 | Arimilli et al. | 711/118 |
| 5,918,250 A | 6/1999 | Hammond | 711/205 |
| 5,918,251 A | 6/1999 | Yamada et al. | 711/207 |
| 5,923,872 A | 7/1999 | Chrysos et al. | 395/591 |
| 5,950,228 A * | 9/1999 | Scales et al. | 711/148 |
| 5,964,867 A | 10/1999 | Anderson et al. | 712/219 |
| 5,983,325 A | 11/1999 | Lewchuk | 711/137 |
| 6,000,044 A | 12/1999 | Chrysos et al. | 714/47 |
| 6,070,227 A | 5/2000 | Rokicki | 711/117 |

(Continued)

OTHER PUBLICATIONS

*Alpha Architecture Reference Manual*, Third Edition, The Alpha Architecture Committee, 1998 Digital Equipment Corporation (21 p.), in particular pp. 3-1 through 3-15.

(Continued)

*Primary Examiner*—David Wiley
*Assistant Examiner*—Arrienne M Lezak (57) ABSTRACT

A system and method is disclosed that reduces the latency of directory updates in a directory based Distributed Shared Memory computer system by speculating the next directory state. The distributed multiprocessing computer system contains a number of processor nodes each connected to main memory. Each main memory may store data that is shared between the processor nodes. A Home processor node for a memory block includes the original data block and a coherence directory for the data block in its main memory. An Owner processor node includes a copy of the original data block in its associated main memory, the copy of the data block residing exclusively in the main memory of the Owner processor node. A Requestor processor node may encounter a read or write miss of the original data block and request the data block from the Home processor node. The Home processor node receives the request for the data block from the Requestor processor node, forwards the request to the Owner processor node for the data block and performs a speculative write of the next directory state to the coherence directory for the data block without waiting for the Owner processor node to respond to the request.

16 Claims, 5 Drawing Sheets

U.S. PATENT DOCUMENTS

| | | | | |
|---|---|---|---|---|
| 6,085,300 | A | 7/2000 | Sunaga et al. | 711/168 |
| 6,226,721 | B1* | 5/2001 | Strongin et al. | 711/158 |
| 6,457,101 | B1* | 9/2002 | Bauman et al. | 711/122 |
| 6,496,917 | B1* | 12/2002 | Cherabuddi et al. | 711/204 |
| 6,591,307 | B1* | 7/2003 | Arimilli et al. | 709/400 |
| 2001/0029574 | A1* | 10/2001 | Razdan et al. | 711/130 |

OTHER PUBLICATIONS

*A Logic Design Structure For LSI Testability*, E. G. Eichelberger et al., 1977 IEEE (pp. 462-468).

*Direct RDRAM™ 256/288-Mbit (512K×16/18×32s)*, Preliminary Information Document DL0060 Version 1.01 (69 p.).

*Testability Features of AMD-K6™ Microprocessor*, R. S. Fetherston et al., Advanced Micro Devices (8 p.).

*Hardware Fault Containment in Scalable Shared-Memory Multiprocessors*, D. Teodosiu et al., Computer Systems Laboratory, Stanford University (12 p.), 1977.

*Cellular Disco: resource management sing virtual clusters on shared-memory multiprocessors*, K. Govil et al., 1999 ACM 1-58113-140-2/99/0012 (16 p.).

*Are Your PLDs Metastable?*, Cypress Semiconductor Corporation, Mar. 6, 1997 (19 p.).

*Rambus® RIMM™ Module (with 128/144Mb RDRAMs)*, Preliminary Information, Document DL0084 Version 1.1 (12 p.).

*Direct Rambus™ RIMM™ Module Specification Version 1.0*, Rambus Inc., SL-0006-100 (32 p.), 2000.

*End-To-End Fault Containment In Sealable Shared-Memory Multiprocessors*, D. Teodosiu, Jul. 2000 (148 p.).

* cited by examiner

SPECULATIVE DIRECTORY WRITES IN A DIRECTORY BASED CACHE COHERENT NONUNIFORM MEMORY ACCESS PROTOCOL

CROSS-REFERENCE TO RELATED APPLICATIONS

"Apparatus And Method For Interfacing A High Speed Scan-Path With Slow-Speed Test Equipment," Ser. No. 09/653,642, filed Aug. 31, 2000; "Priority Rules For Reducing Network Message Routing Latency," Ser. No. 09/652,322, filed Aug. 31, 2000; "Scalable Directory Based Cache Coherence Protocol," Ser. No. 09/652,703, filed Aug. 31, 2000; "Scalable Efficient I/O Port Protocol," Ser. No. 09/652,391, filed Aug. 31, 2000; "Efficient Translation Lookaside Buffer Miss Processing In Computer Systems With A Large Range Of Page Sizes," Ser. No. 09/652,552, filed Aug. 31, 2000; "Fault Containment And Error Recovery Techniques In A Scalable Multiprocessor," Ser. No. 09/651,949, filed Aug. 31, 2000; "Special Encoding Of Known Bad Data," Ser. No. 09/652,314, filed Aug. 31, 2000; "Broadcast Invalidate Scheme," Ser. No. 09/652,165, filed Aug. 31, 2000; "Mechanism To Track Open Pages In A DRAM Memory System," Ser. No. 09/652,704, filed Aug. 31, 2000; "Programmable DRAM Address Mapping Mechanism," Ser. No. 09/653,093, filed Aug. 31, 2000; "Computer Architecture And System For Efficient Management Of Bi-Directional Bus," Ser. No. 09/652,323, filed Aug. 31, 2000; "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache,"Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "Mechanism To Reorder Memory Read And Write Transactions For Reduced Latency And Increased Bandwidth," Ser. No. 09/653,094, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652,451, filed Aug. 31, 2000; "Mechanism For Synchronizing Multiple Skewed Source-Synchronous Data Channels With Automatic Initialization Feature," Ser. No. 09/652,480, filed Aug. 31, 2000; "Mechanism To Control The Allocation Of An N-Source Shared Buffer," Ser. No. 09/651,924, filed Aug. 31, 2000; and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system with multiple processors. More preferably, the present invention generally relates to the sharing of data among processors in a Distributed Shared Memory ("DSM") computer system. Still, more particularly, the invention relates to a system and method that reduces the latency of directory updates in a directory based Distributed Shared Memory computer system by speculating the next directory state.

2. Background of the Invention

Distributed computer systems typically comprise multiple computers connected to each other by a communications network. In some distributed computer systems, the network computers can access shared data. Such systems are sometimes known as parallel computers. If a larger number of computers are networked, the distributed system is considered to be "massively" parallel. One advantage of a massively parallel computer is that it can solve complex computational problems in a reasonable amount of time. In such systems, the memories of the computers are collectively known as a Distributed Shared Memory ("DSM").

Recently, DSM systems have been built as a cluster of Symmetric Multiprocessors ("SMP"). In SMP systems, shared memory can be implemented efficiently in hardware since the processors are symmetric (e.g., identical in construction and in operation) and operate on a single, shared processor bus. Symmetric Multiprocessor systems have good price/performance ratios with four or eight processors. However, because of the specially designed bus that makes message passing between the processors a bottleneck, it is difficult to scale the size of an SMP system beyond twelve or sixteen processors.

It is desired to construct large-scale DSM systems using processors connected by a network. The goal is to allow processors to efficiently share the memories so that data fetched by one program executed on a first processor from memory attached to a second processor is immediately available to all processors.

One problem of large-scale DSM systems using processors connected by a network is ensuring that the data stored in the DSM is accessed in a coherent manner. Coherency, in part, means that only one processor can modify any part of the data at any one time, otherwise the state of the system would be nondeterministic. Maintaining coherency of data in the DSM is solved in part by directory based memory coherence protocols. Each data block in the DSM system has an assigned Home processor that contains directory information stored in Dynamic Random Access Memory ("DRAM") for the data block. The directory for a data block keeps track of the current state of the data block. When a request by another processor is made for a data block in DSM, both the data block and its current directory are read from the data block's assigned Home processor. After examining the current directory state, the Home processor performs some action to service the request, and the data block's next directory state is written back to memory.

For each data block requested, the directory-based coherence protocol must perform a write to the directory stored in DRAM memory to reflect the data block's next directory state. Remote processors in the DSM computer system may contain a copy of a data block from a Home processor that the remote processor is capable of writing to because the remote processor is exclusive Owner of the data block. Each data block's next directory state is reflected in the directory for the data block stored in the Home processor after the remote processor receives a copy of the data block. When a remote processor requests a copy of the data block, the request is sent to the Home processor chip for the data block that then forwards the request to any processors that are exclusive Owners. In such situations where a request must be forwarded off-chip, the next directory state may not be known for many hundreds or even thousands of machine clock cycles. This can result in increased memory write latencies and corresponding decrease in memory subsystem performance because a large amount of time may elapse between the read of the current directory (to forward the request off-chip) and the write of the next directory state after the remote processor containing an exclusive copy replies. This long delay before writing the next directory state results in tying up hardware in a wait state for the entire duration of the delay. Furthermore, the DRAM page containing the directory to be updated may have been closed by the time the reply from the processor containing the exclusive copy returns, further reducing memory system performance. Therefore, a system and method is needed that allows the Home processor to update the directory to indicate the next directory state while eliminating long memory latencies and reactivation of DRAM memory pages closed because of long reply delays when a request is forwarded off-chip.

BRIEF SUMMARY OF THE INVENTION

The problems noted above are solved in large part by a distributed multiprocessing computer system that contains a plurality of processors, each connected to RAMbus™ Inline Memory Module ("RIMM") main memory. Thus, each processor preferably has an associated main memory constructed of RIMMs. Each RIMM contains data that is shared between the processors. The main memory is subdivided into logical data blocks indexed by a physical address used by the processor to access the data block. Each data block has an associated directory that maintains the coherence of the data in the data block across all processors that may contain a copy of the data block in the distributed multiprocessing computer system. Each data block in main memory and its associated coherence directory has a designated Home processor. The Home processor contains the original data block-other processors needing access to the data block only contain copies of the Home processor data block. An Owner processor is another processor in the multiprocessing computer system that includes a copy of the Home processor data block in the Owner processor main memory. Whenever an Owner processor is associated with a data block, it is the only processor in the distributed multiprocessing computer system permitted to contain a copy of the Home processor data block. The Owner processor has permission to modify the contents of the data block.

In the distributed multiprocessing computer system, a processor needing to read or write to a data block not present in its main memory or cache must then request a copy of the data block from the Home processor. This processor is referred to as a Requester processor. A data block in the distributed multiprocessing computer system also may be shared by multiple processors that have read only access capabilities to the data block. These Sharer processors each contain a shared copy of the data block in a cache connected to the Sharer processor main memory.

In the distributed multiprocessing computer system, a Requestor processor that encounters a read or write miss of a data block in its main memory requests the data block from the Home processor. The Home processor receives the request for the data block from the Requestor processor, forwards the request to the Owner processor for the data block and performs a speculative write of the next directory state to the coherence directory for the data block without waiting for the Owner processor to respond to the request. This speculative write of the next directory state occurs only if the next directory state cannot be determined and the Home processor and Owner processor are two different processor chips in the computer system. In addition, the RIMM main memory containing the coherence directory for the data block during the speculative write of the next directory state is in a low latency state that reduces memory read and write access times. This is because the speculative write occurs immediately after a read of the coherence directory for the data block that results in the RIMM main memory containing the data block to be in an open page state. If the response by the Owner processor to the Home processor request for the data block indicates a different next directory state from the next directory state speculatively written by the Home processor to the coherence directory for the data block, then the correct next directory state is written by the Home processor for the data block in the coherence directory.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
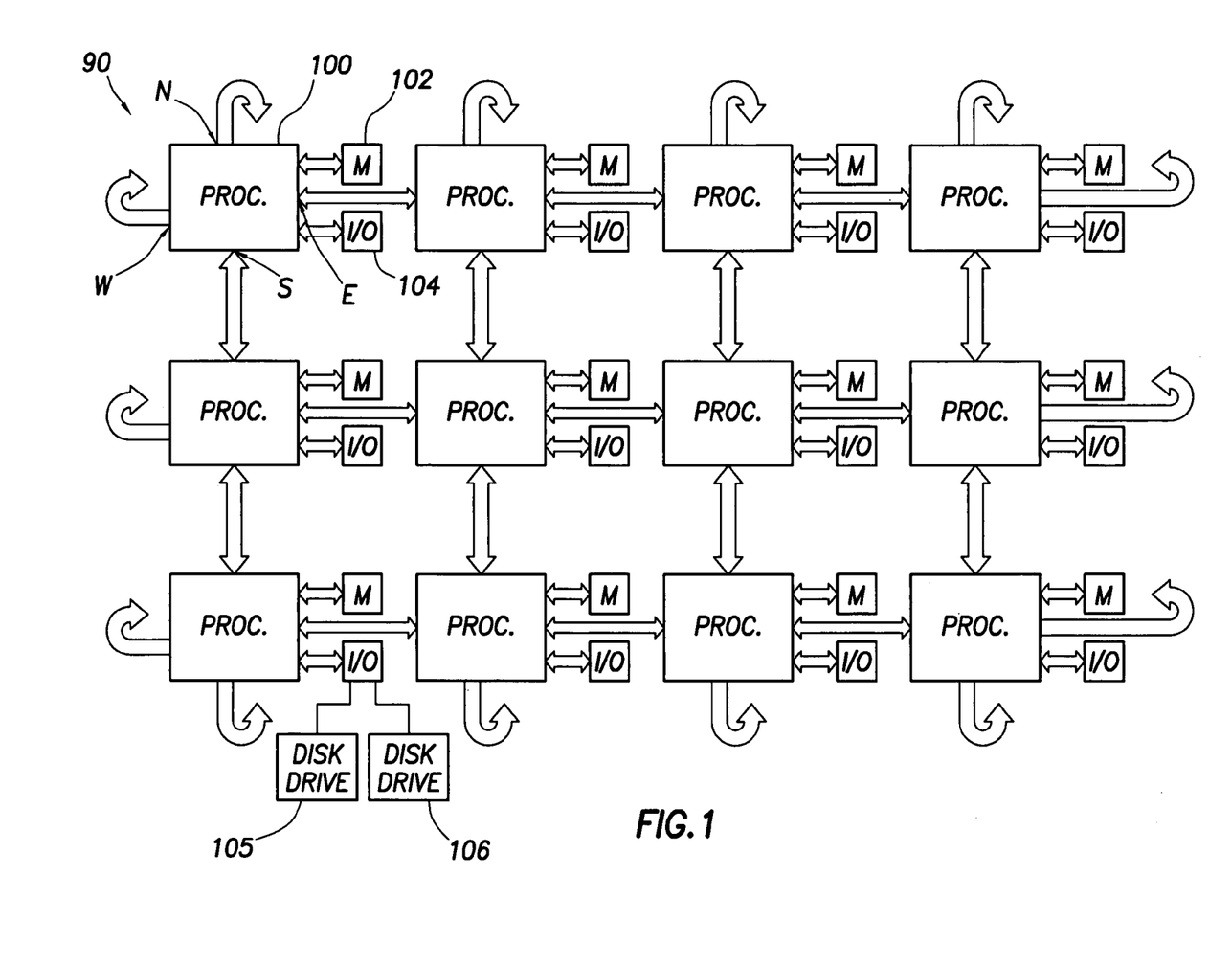
FIG. 1 shows a system diagram of a plurality of processors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes twelve processors 100, each processor coupled to a memory and an I/O controller. Each processor preferably includes four ports for connection to adjacent processors. The interprocessor ports are designated "North," "South," "East," and "West" in accordance with the well-known Manhattan grid architecture. As such, each processor 100 can be connected to four other processors. The processors on both ends of the system layout wrap around and connect to processors on the opposite side to implement a 2D torus-type connection. Although twelve processors 100 are shown in the exemplary embodiment of FIG. 1, any desired number of processors (e.g., 256) can be included. For purposes of the following discussion, the processor in the upper, left-hand corner of FIG. 1 will be discussed with the understanding that the other processors 100 are similarly configured in the preferred embodiment.

As noted, each processor preferably has an associated I/O controller 104. The I/O controller 104 provides an interface to various input/output devices such as disk drives 105 and 106, as shown in the lower, left-hand corner of FIG. 1. Data from the I/O devices thus enters the 2D torus via the I/O controllers.

Each processor also, preferably, has an associated memory 102. In accordance with the preferred embodiment, the memory 102 preferably comprises RAMbus™ memory devices, but other types of memory devices can be used, if desired. The capacity of the memory devices 102 can be any suitable size. Further, memory devices 102 preferably are implemented as Rambus Interface Memory Modules ("RIMM").

In general, computer system 90 can be configured so that any processor 100 can access its own memory 102 and I/O devices, as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2A:
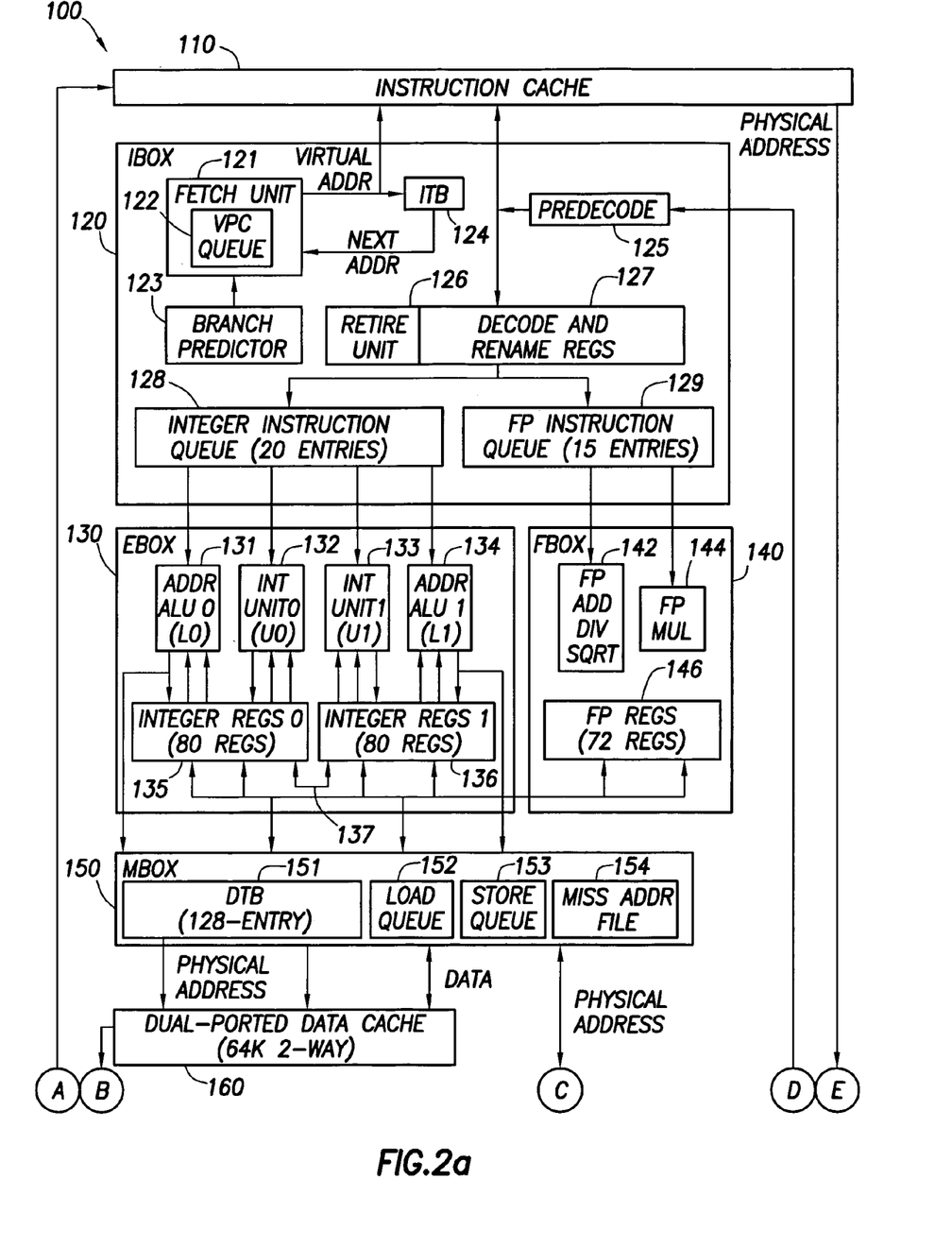
FIGS. 2a and 2b show a block diagram of the processors of FIG. 1.
Figure 2B:
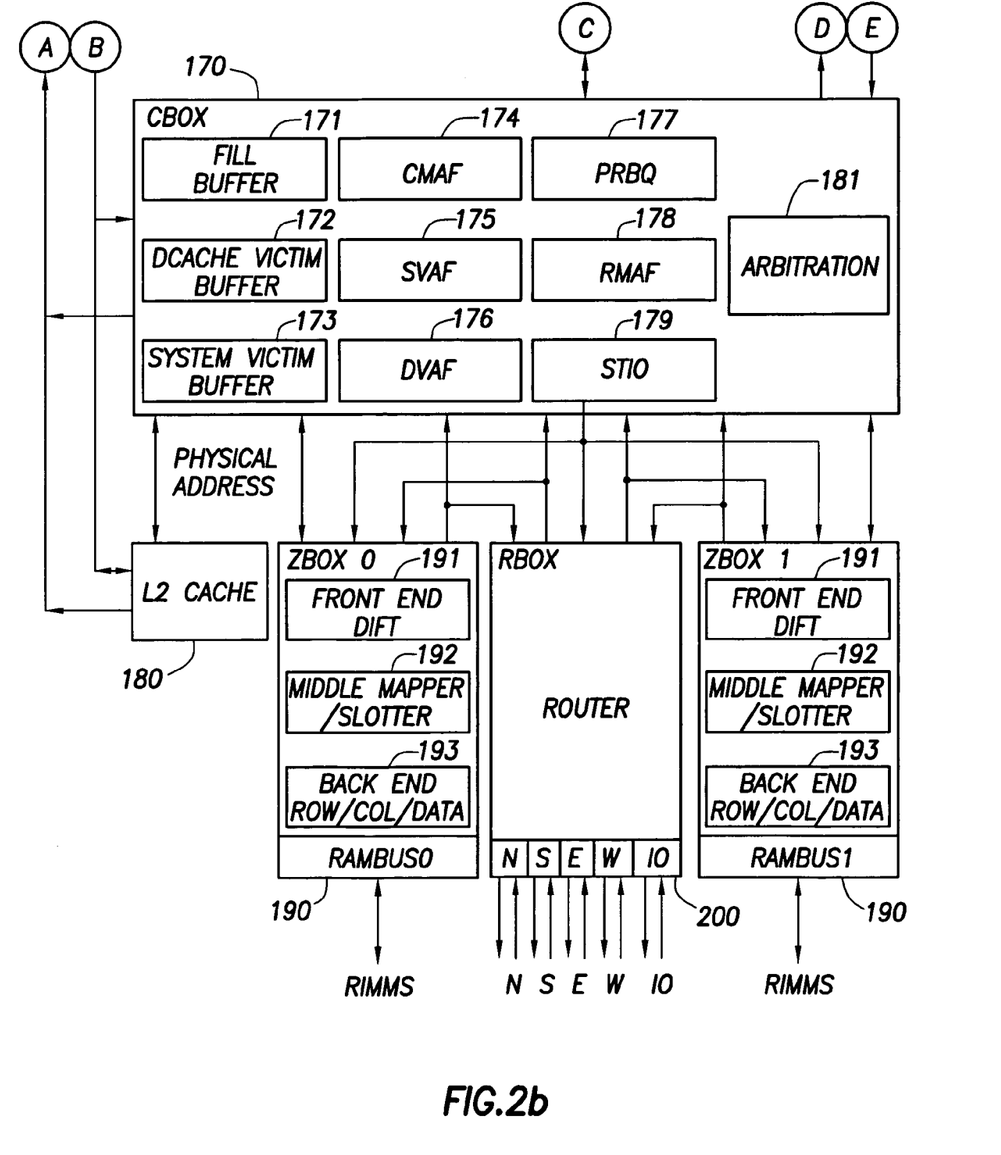

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicates with the control logic of various other functional units, control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

With regard to branch instructions, the Ibox 120 uses the branch predictor 123. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, twenty valid fetch slots containing up to eighty instructions can be in flight between the registers 127 and the end of the processor's pipeline, where control flow is finally resolved. The register 127 logic is capable of backing up the contents of the registers to the state associated with any of these 80 instructions in a single cycle. The register logic 127 to preferably places instructions into the integer or floating-point issue queues 128, 129, from which they are later issued to functional units 130 or 136 for execution.

The integer instruction queue 128 preferably includes capacity for twenty integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals-one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible twenty requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register-to-integer-register transfer instructions are queued in both the integer and floating-point queues. These instructions wait in the floating-point queue until their operand register values are available from the floating-point execution unit ("Fbox") registers. The processor executing these instructions subsequently request service from the store arbiter. Upon being issued from the floating-point queue 129, the processor executing these instructions signal the corresponding entry in the integer queue 128 to request service. Finally, the operation is complete after the instruction is issued from the integer queue 128.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for seventy-two entries including thirty-one floating-point registers and forty-one values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It preferably contains thirty-two entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It preferably contains thirty-two entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor. The miss address file ("MAF") 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and a single secondary-level, unified instruction/data ("L2") cache 180 (FIG. 2b). The L1 instruction cache 110 preferably comprises a 64-KB virtual-addressed, two-way set-associative cache. Prediction of future instruction execution is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably comprises a 64 KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 preferably is organized to contain two sets, each with 512 rows containing 64-byte blocks per row (i.e., 32 KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

As will be understood by one skilled in the art, the L2 cache 180 comprises a secondary cache for the processor 100, which typically is implemented on a separate chip. The L2 cache 180 preferably comprises a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 in the Cbox preferably buffers data received from other functional units outside the Cbox 170. The data and instructions get written into the fill buffer 171 and other logic units in the Cbox 170 process the data and instructions before sending to another functional unit or the L1 cache 110 and 160. The data cache victim buffer ("VDF") 172 preferably stores data flushed from the L1 cache 110 and 160 or sent to the System Victim Data Buffer 173. The System Victim Data Buffer ("SVDB") 173 sends data flushed from the L2 cache to other processors in the system and to memory. Cbox Miss-Address File ("CMAF") 174 preferably holds addresses of L1 cache misses. CMAF 174 updates and maintains the status of these addresses. The System Victim-Address File ("SVAF") 175 in the Cbox 170 preferably contains the addresses of all SVDB data entries. Data Victim-Address File ("DVAF") 176 preferably contains the addresses of all data cache victim buffer ("VDF") 172 data entries.

The Probe Queue ("PRBQ") 177 preferably comprises a 18-entry queue that holds pending system port cache probe commands and addresses. The Probe Queue 177 includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox 170 preferably accepts requests and responds with data or instructions from the L2 cache. Data accesses from other functional units in the processor, other processors in the computer system or any other devices that might need data out of the L2 cache are sent to the RMAF 178 for service. The Store Input/Output ("STIO") 179 preferably transfer data from the local processor to I/O cards in the computer system. Finally, arbitration unit 181 in the Cbox 170 preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus memory controllers 190 (Zbox0 and Zbox1). Each Zbox 190 controls 4 or 5 channels of information flow with the main memory 102 (FIG. 1). Each Zbox 190 preferably includes a front-end directory in flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox 200, sending response commands to and receiving packets from the Cbox 170 and Rbox 200, and tracking up to thirty-two in-flight transactions. The front-end DIFT 191 also sends directory read and write requests to the Zbox 190 and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 3:
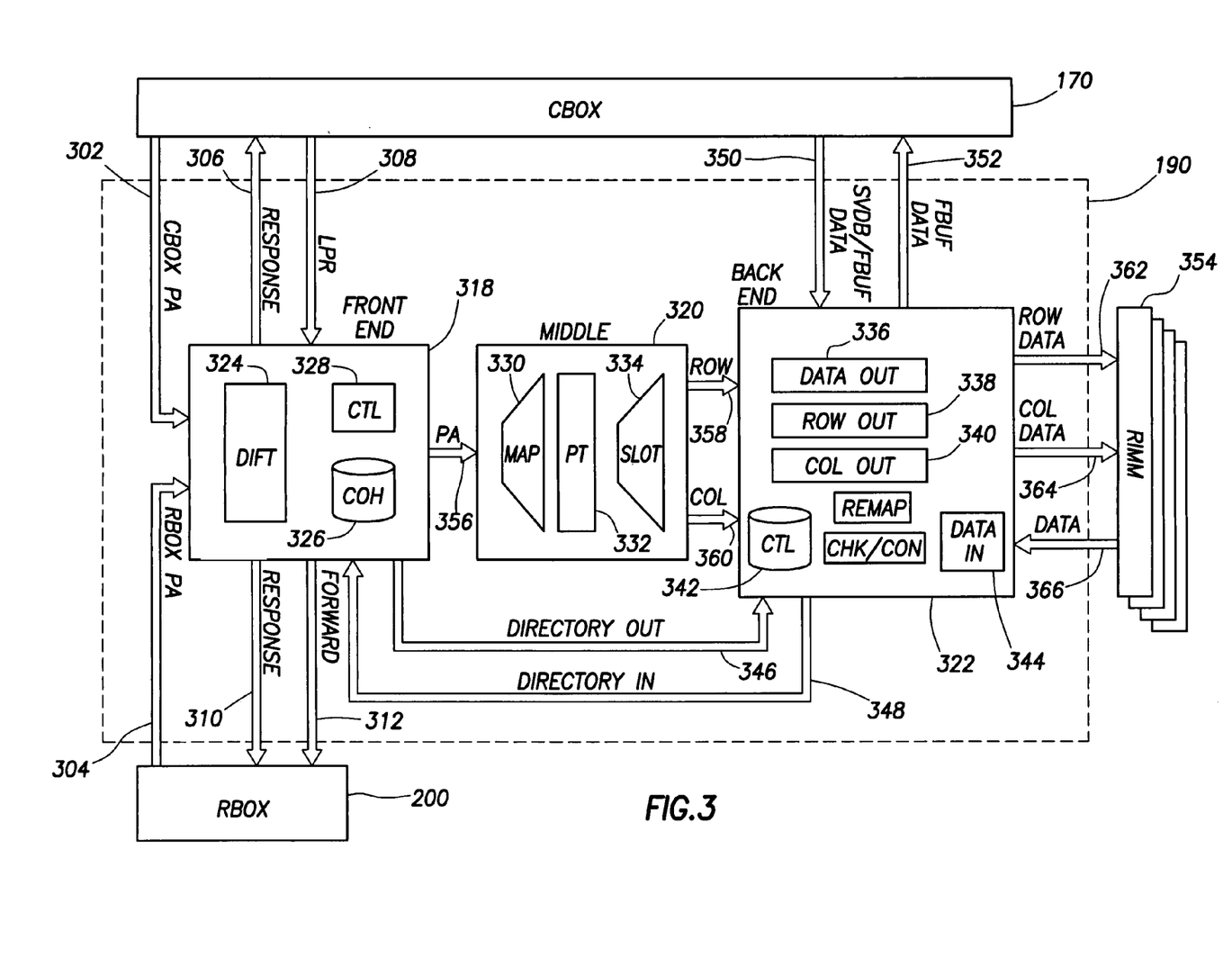
FIG. 3 shows the Zbox memory controller of FIG. 2b in more detail including the coherency hardware.

Referring now to FIG. 3, a more detailed description of the Zbox front end, middle and back end hardware. The front end 318 of the Zbox 190 may receive a physical address 302 from the Cbox 170 or a physical address 304 from the Rbox 200. The front end also generates and transmits Response messages 306 and 310 to the Cbox 170 and Rbox 200. Forward coherence messages 312 are generated by the front end 318 and transmitted to the Rbox 200. The Cbox 170 transmits Local Probe Responses ("LPR") 308 to the front end. The front end 318 contains a directory in flight table ("DIFT") 324, Controller ("CTL") 328 and the cache coherence controller 326 that manages the directory based memory coherence protocol for the cache and main memory.

The DIFT receives message packets from the Cbox 170 or the Rbox 200. It sends directory read and write requests generated by the coherency controller to the Zbox middle section 320. The DIFT instructs the back end 322 to write memory data and ECC (error correction codes) into a fill buffer 171 in the Cbox 170 to satisfy the request. The directory in flight table also receives local probe responses from the Cbox 170.

When a request is made for a data block in the cache or main memory, both the data block and its current directory are read from the cache or main memory. Coherence controller 326 in conjunction with the directory in flight table after examining the request type, LPR status, and current directory state speculatively updates the directory state through the directory out bus 346 to the coherence table 342. If the request is a local reference and does not need to be forwarded off chip, the next directory state can be determined immediately. This is because for a local reference, the next directory state is the same as the current directory state. A local reference to a processor's shared data does not update the coherence directory since coherence for a local reference is maintained by forcing all remote requests to locally probe the caches, MAF and the VAF before a request can complete. Thus, no speculative write is required in this case. If the request is a remote reference that is forwarded off chip to another processor, the next directory state cannot immediately be determined. However, the next directory state can be narrowed down to a very few choices of which one is much more probable than the others. It is this most probable next directory state, described in greater detail below, that is written immediately to the coherence directory for the remote reference. Thus, in such nonuniform memory access systems, the speculative write of the next directory state experiences only a slightly higher memory latency compared to the local reference in which the coherence directory was not updated and no write performed. Once a reply to the remote reference that was forwarded off chip has occurred, the next directory state can then be confirmed. If the speculative directory write was incorrect, a second write to the coherence directory with the correct next directory state is performed. However, an incorrect speculative directory write is extremely rare compared to a correct speculative directory write and thus speculation of next directory states leads to an overall increase in memory subsystem performance.

Returning now to the description of FIG. 3, Zbox middle section 320 consists of a map 330 that maps the Physical Address ("PA") 356 received from the front end into preferably RAMbus™ device format by device, bank, row and column. The map 330 also maintains an open page table 332 that tracks all open pages up to one kilobyte in size. The map closes pages in the page table 332 on demand if there are bank conflict issues. A slot 334 schedules RAMbus™ transactions by updating request queues PRE, RAS and CAS.

The Zbox back end 322 packetizes address, control and data into RAMbus™ format. The Zbox back end includes registers data out 336, row out 338 and column out 340. The data in buffer 344 takes inbound data from RAMbus™ Inline Memory Modules ("RIMM") and converts this to the appropriate format accessible to the processor. The back end receives from the Cbox 170 system victim and fill buffer data 350 and outputs fill buffer data 352 to the Cbox. Back end 322 receives row 358 and column 360 address from the middle section and converts these octaword formats to 8-byte RAMbus™ format.

Figure 4:
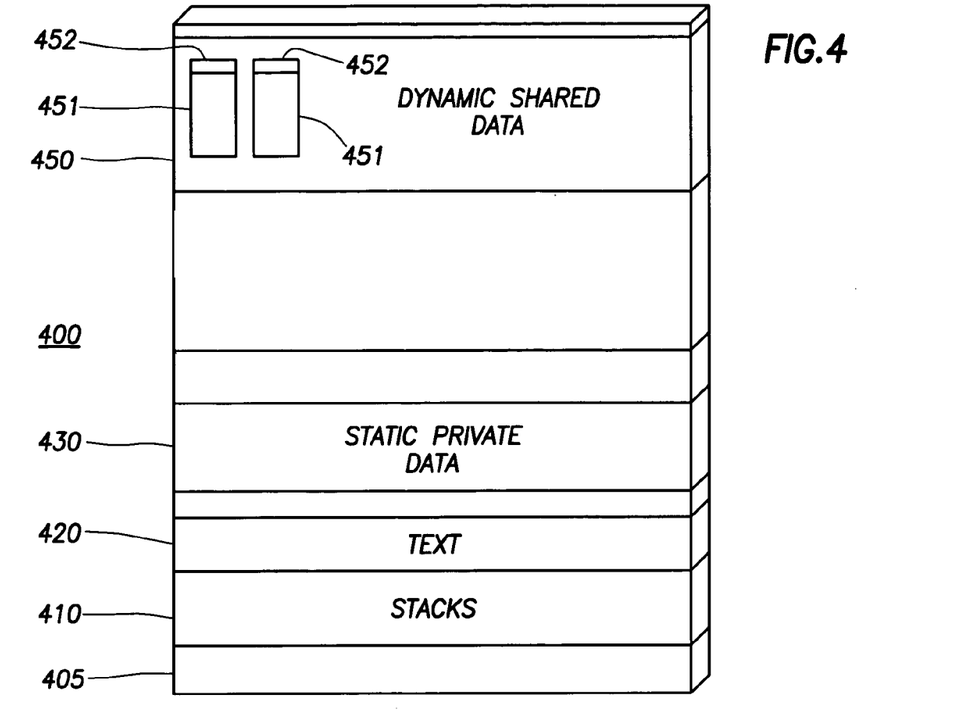
FIG. 4 shows a block diagram of main memory partitioned into shared, private, and system space.

Referring now to FIG. 4, an allocation of addresses to a block of memory in RAMbus™ DRAM 354 as used in the preferred embodiment of the DSM computer system is shown. Addresses are reserved for stacks 410, program text 420, static private data 430, and dynamic shared data 450. The addresses in the static private data 430 are used to store data that are exclusively used by a single local processor, e.g., the data are not shared. The addresses in this portion of the memory are allocated when a particular program is loaded for execution.

In the preferred embodiment shown in FIG. 4, the processor generates 72-byte blocks of storage 451 in the shared data area of processor memory as shared memory. Preferably, coherence is maintained by means of the directory scheme noted above. This directory scheme maintains state information with each block of memory. The state indicates the current state of the block as well as the processors in the distributed computer system holding copies of the block. For each 64-bytes in the RAMbus™ DRAM, there are actually 72-bytes of storage, leaving 8 additional bytes, 452. In the preferred embodiment, the processor allocates a 9-bit ECC code on each 16-bytes of data. In addition to being stored with the 16-bytes in the RAMbus™ storage, the 9-bit ECC code is also used by the system caches. The 36-bit (64/16=4, 4*9=36 bits) ECC code leaves an extra 28 bits (8*8=64 bits, 64−36=28 bits) of storage for the directory information with each 72-byte block. Of the available 28 bits, 27 are used so that the directory information can be written independently of the data using the byte write capability of the RAMbus™ (RAMbus™ is capable of writing 9 bit bytes). Of the 27 bits, 6 bits are required for ECC coverage of the directory information and 21 bits of storage are available for the directory information.

In the preferred embodiment, the supported cache states are listed in Table 1.

TABLE 1

CACHE STATES

| STATE | MEANING |
|---|---|
| Invalid | Invalid error state. |
| Exclusive-Clean | This processor has an exclusive copy, the value is the same as memory. |
| Exclusive-Dirty | This processor has an exclusive copy, the value may be different than memory. |
| Shared | This processor has a read-only copy, the value is the same as memory. |

The processor must have a block in the Dirty state in the cache to write to the block in RAMbus™ memory.

A directory state stored in the shared data section 450 of RAMbus™ memory is 27-bits encoded as listed in Table 2 below. The least significant bits of any field in the Table are on the right side.

TABLE 2

DIRECTORY STATE ENCODING

| STATE | ENCODING: | | | | COMMENTS |
|---|---|---|---|---|---|
| Bit Num. | | 2 | 11 | 0 0 | |
| Bit Num. | 5 | 0 | 21 | 3 0 | |
| Local | CCCCCCXXXXXXXXXXXXXXXXX0000 | | | | |
| Incoherent | CCCCCCXXXXXXXXXXXXXXXXX1000 | | | | |
| Exclusive | CCCCCCXXXXXXXXEEEEEEEEI100 | | | | |
| Shared1 | CCCCCCXXXXXXXXXSSSSSSSS1110 | | | | Shared with list of one share—S |
| Shared2 | CCCCCCXTTTTTTTTSSSSSSSS0110 | | | | Shared with list of two shares—T, S |
| Shared3 | CCCCCCUUUTTTTTTTUUSSSSSSU010 | | | | Shared with list of three sharers—U, T, S |
| SharedM | CCCCCCMMMMMMMMMMMMMMMMMMMM1 | | | | Shared with mask |

Each symbol's meaning is given below:
X Don't care.
C Error Correction Code ("ECC") storage.
I Tells whether the exclusive Owner is a DMA device (1=DMA).
E Eight bits for the (encoded) exclusive Owner when in exclusive state allowing for 256 processors and an additional 256 DMA/IO devices.
M 20 bits for the sharing mask when in shared state.
S 8/6 bits for the first sharer.
T 8/6 bits for the second sharer.
U 6 bits for the third sharer, S and T are 6 bits.

Table 3 lists the directory states.

TABLE 3

DIRECTORY STATES

| STATE | MEANING |
|---|---|
| Local state | Implies that no remote processors have a copy of the block. The block may be held either shared or exclusive locally (or not held at all). |
| Incoherent state | An error state. Error status (ERRResp) is returned in response to a request to an incoherent block. |
| Exclusive state | Implies that exactly one remote processor holds the current copy of the block. The block may be either in the exclusive-clean or dirty states in the cache at that processor. A request that finds a block in the exclusive state will be forwarded to the exclusive Owner. |
| Shared1 | Implies that one remote processor may have shared access to a block (as well as the local processor). |
| Shared2 | Implies that two processors may have shared copies of the block (as well as the local processor). |
| Shared3 | Implies that three processors may have shard copies of the block (as well as the local processor). This state is used only when the system has 64 processors or less. It is enabled by ZBOX0_PID_CTL[PIDWIDTH]. |
| SharedM state | Implies that one or more remote processors may have shared copies of the block, and that the local processor may also have a shared copy of the block. Each M bit indicates whether the corresponding processor(s) may have a copy of the block. An M bit is never set for the local processor. IPR settings define the correspondence between the bits in the mask and the processors in the system. For a simple example, each bit in the mask may refer to a four-processor quad in a 80-processor system. |

In the preferred embodiment of the invention, coherence messages are split into three types: REQUEST, FORWARD and RESPONSE. Load data REQUEST's are transferred from the requesting processor to the directory. The directory is examined to determine further action. If the block is local (that is, invalid in remote processors), the directory is updated and a RESPONSE is returned. If the block is in the exclusive state, the request may be FORWARD'ed from the directory to the exclusive Owner of the block. A FORWARD'ed request normally results in a RESPONSE sent to both the Requestor and to the directory. If the block is in the shared state and the request is to modify the block, invalidations of the shared blocks are FORWARD'ed from the directory to each of the shared copies and a RESPONSE is also sent to the Requestor. Upon receipt of the FORWARD'ed invalidates, a processor responds with invalidate acknowledge RESPONSE's.

The physical address space is partitioned into a Directory Processor Identifier ("DPID") and offset address. The DPID is the processor holding the physical memory and the offset address that selects which address at that processor. The processor of the preferred embodiment has a 43-bit physical address and a 43-bit I/O space address.

Figure 5A:
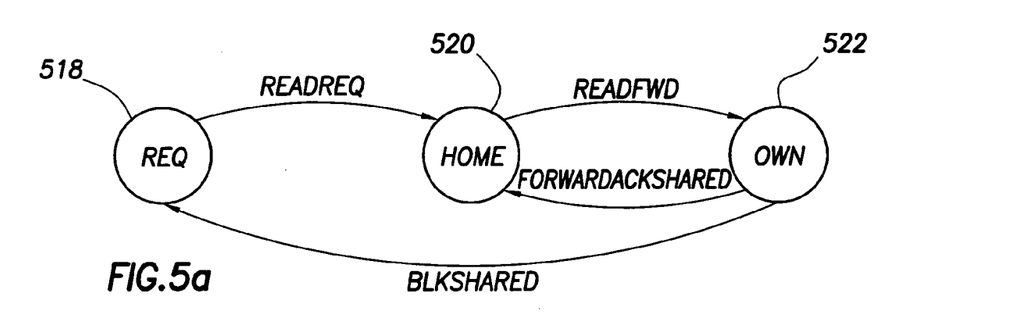
FIG. 5a shows an example of a remote read request with an Owner that is remote from the Home.
Figure 5B:
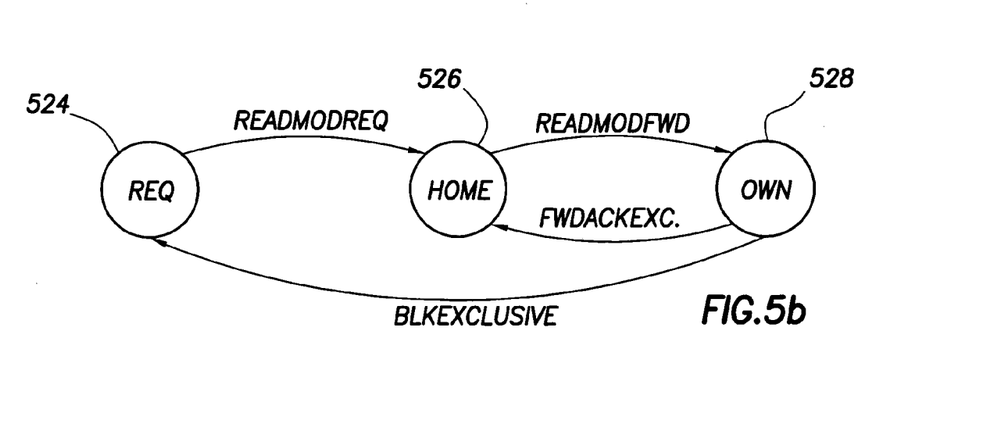
FIG. 5b shows an example of a remote write request with an Owner that is remote from the Home.

Turning now to FIG. 5a and FIG. 5b, two situations illustrate use of the preferred embodiment in which speculative directory writes for cache and memory coherence would reduce directory update latency resulting in improved memory subsystem performance. The terminology for this directory-based scheme is shown in FIG. 5a and FIG. 5b. Processors may be one of four types defined as follows:

Requestor ("Req")—a processor encountering a read or write miss.

Home—a processor that contains the memory and directory for the reference block.

Owner ("Own")—a remote processor that contains an exclusive copy of the block in its cache.

Share ("S")—a remote processor that contains a shared copy of the block in its cache.

FIG. 5a shows a read request from a Requestor processor 518 for a data block present in a remote Owner processor 522. In this scenario, the Home processor 520 is remote, and the directory state is Exclusive with the cache at the processor in the Owner 522 in a Clean state. The Requestor processor 518 requests a read ("READREQ") of the data block that is sent to the Home processor 520 that contains the memory and directory for the referenced block. The Home processor 520 forwards the request to the Owner processor 522 ("READFWD"). The Home processor 520 then speculatively determines the next directory state based on the request type and current directory state. The data block requested is returned to the Requestor processor 518 in either the Shared or Exclusive state (see Table 3 above) depending on whether the Owner processor 522 will need access to the data block in the future. Because the data block in Owner processor 522 is in an Exclusive state, the Home processor 520 will speculate the next most probable directory state of the data block as Shared. If the Owner processor 522 sends a read reply BLKSHARED with the data to the Requestor processor 518 and sends a FORWARDACK-SHARED message to Home processor indicating that the block is shared as shown in FIG. 5a, then the speculative directory write of Shared processor for the data block will be confirmed. The coherence directory for the data block will indicate both the prior exclusive Owner processor 522 and the Requestor processor 518 in the sharing list. If the Owner processor 522 writes the data block and sends a FORWARDACKEXCL message to Home processor 520 and BLKEXCLUSIVE message with the data block to Requestor processor 518, then the speculative directory write of Shared for the data block will have been incorrect. The coherence directory entry for the data block will be changed to Exclusive indicating that the Requestor processor 518 has an exclusive copy of the data block. The Owner processor 522 may no longer need the data block (i.e., computer program using the data block completed execution, shared memory section of physical memory low on space and data block not referenced in long while) and thus evict the data block from shared memory rather then keeping a shared copy.

FIG. 5b shows a write request from a Requestor processor 524 to a data block present in a remote Owner processor 528. In this scenario, the Home processor 526 is remote, and the directory state is exclusive with the cache at the processor in the Owner processor 528 in either a clean or dirty state. The Requestor processor 524 issues a modify request ("READ-MODREQ") that is sent to the Home processor 526 containing the memory and directory for the referenced block. The Home processor 526 forwards the modify request to the Owner processor 528 ("READMODFWD") and then speculatively determines the next directory state based on the request type and current directory state. The data block requested may be returned to the Requestor processor 524 in either the Exclusive or Incoherent state (see Table 3 above). An Incoherent state for a data block is caused by hardware errors in the area of physical memory containing the data block that causes the data block to be incoherent. Under the memory coherence rules of the preferred embodiment, a Requestor processor 524 to modify the data block must have Exclusive Ownership of the data block. Thus, because Requestor processor 524 request will modify the data block, the Home processor 526 will speculate the next most probable directory state of the data block as Exclusive. If the Owner processor 528 sends a reply BLKEXCLUSIVE with the data to the Requestor processor 524, writing back the data to Home processor 526 and sending a FWDACKEXCL message to Home processor 526 indicating that the data block is exclusively owned by Requestor processor 524 as shown in FIG. 5b, then the speculative directory write of Exclusive for the data block will be confirmed. The coherence directory for the data block will indicate the Requestor processor 524 as containing an exclusive copy of the data block. If the Owner processor 528 sends an ERRRESP message to Home processor 526 and ERRRESP message to Requestor processor 524, then the speculative directory write of Exclusive for the data block will have been incorrect. The coherence directory entry for the data block will be changed to Incoherent indicating that the data block is in an error state. The Home processor 526 will regenerate the READMODFWD request to Owner processor 528 to try to retrieve the data block.

Another situation in which speculative directory writes for cache and memory coherence would reduce directory update latency occurs when RAID mode is enabled in the Zbox memory controller. In the preferred embodiment, each Zbox memory controller 190 shown in FIG. 3 includes four memory channels that permit data transfer between each of the four RIMMs and the processor. When RAID mode is enabled in the Zbox memory controller, a fifth channel is enabled that allows the computer system to tolerate the failure of any single RDRAM device or any single row/page within a RDRAM device. In the preferred embodiment, when RAID mode is enabled, a read-modify-write sequence is needed to update the directory state when the fill buffer 171 of the Cbox 170 does not contain a copy of the data block. A read-modify-write sequence takes place when a request by another processor is made for a data block in distributed shared memory. Both the data block and its current directory are read from the data block's assigned Home processor. After examining the current directory state, the Home processor performs some action to service the request, modifies the data block's current directory state and then writes the next directory state (modified current directory state) back to memory.

In the read-modify-write sequence, the Home processor after performing a read of the requested data block and the data block's current directory stores this data in the Zbox 170 fill buffer 171. When the directory state is updated, the data is removed from the fill buffer. For requests that need not be forwarded off the Home processor chip, the update of the directory state for the data block occurs soon after the read of the data block and its current directory, releasing the fill buffer so that it can be used for requests from other processors. If the request for the data block is forwarded to another processor that is an exclusive Owner, the response may take many hundreds or even thousands of machine clock cycles. If a speculative write of the next directory state is not done for requests forwarded off chip, then either the fill buffer will remain occupied until the response comes back from the exclusive Owner or the Zbox can release the fill buffer immediately without waiting for the response. If the fill buffer remains occupied until the response comes back, then the fill buffer cannot be used for requests from other processors.

The Zbox releasing the fill buffer immediately without waiting for a response can reduce memory system performance if the response from the exclusive Owner does not contain a copy of the data block. Thus, another read-modify-write sequence would be required to update the directory state when the response returned since the copy of the data block was lost when the fill buffer was released. One example occurs when the Home processor sends a READ-MODFORWARD to the Owner and the Owner responds with a FORWARDACKEXCL response that does not contain a copy of the data block. Thus, a read-modify-write sequence is required to update the directory state when the FORWARDACKEXCL arrives. Another read of the memory to retrieve the data block and directory can be avoided using speculative directory writes since the same data from the original read before the READMODFORWARD was sent is used to update the directory state.

In the preferred embodiment, the predicted next directory state can be selected to minimize unnecessary main memory reads caused by read-modify-write sequences. In one scenario, if the Owner is likely to respond VICTIMACKEXCL (data block is written back and exclusively owned by Requestor) or FORWARDACKSHARED (data block is not written back and shared by Owner), the Zbox memory controller in the Home processor would select the next state as shared for the speculative directory write to reduce read-modify-write sequences. If the Zbox memory controller had selected the exclusive state and received a FORWARDACKSHARED response instead, then a read-modify-write sequence resulting in significant performance loss would be required to correct the error. If, however, the Zbox memory controller had selected the shared state and received a VICTIMACKEXCL response including the data block, an extra write to main memory to store the data block and updating the directory state to exclusive for the data block is all that is needed.

The above discussion is meant to be illustrative of the principles and various embodiments of the present invention. Numerous variations and modifications will become apparent to those skilled in the art once the above disclosure is fully appreciated. For example, the directory states and encodings shown in Table 1, Table 2, and Table 3 may be extended to other encodings and directory states (e.g., a Shared4 state, sharing with four sharers) in the preferred embodiment of the invention. It is intended that the following claims be interpreted to embrace all such variations and modifications.

What is claimed is:

1. A distributed multiprocessing computer system, comprising:
    a plurality of processor nodes each coupled to an associated memory module, wherein each memory module may store data that is shared between said processor nodes;
    a Home processor node that includes a data block and a coherence directory for said data block in an associated memory module;
    an Owner processor node that includes a copy of said data block in a memory module associated with the Owner processor node, said copy of said data block residing exclusively in said memory module;
    a Requestor processor node that encounters a read or write miss of said data block and requests said data block from the Home processor node; and
    wherein said Home processor node receives the request for the data block from the Requestor processor node, forwards the request to the Owner processor node for the data block and performs a speculative write of the next directory state to the coherence directory for the data block without waiting for the Owner processor node to respond to the request.

2. The distributed multiprocessing computer system of claim 1, wherein the speculative write of the next directory state occurs only if the next directory state cannot be determined and the Home processor node and Owner processor node are two different processor chips in the computer system.

3. The distributed multiprocessing computer system of claim 1, wherein the memory module containing the coherence directory for the data block is in a low latency state that reduces memory read and write access times while the Home processor node is performing the speculative write of the next directory state to the coherence directory for the data block.

4. The distributed multiprocessing computer system of claim 1, further comprising correcting the next directory state for the data block if the response by the Owner processor node to the Home processor node request for the data block indicates a different next directory state from the next directory state speculatively written by the Home processor node to the coherence directory for the data block.

5. A distributed multiprocessing computer system, comprising:
   a plurality of processor-nodes each coupled to an associated memory module, wherein each memory module may store data that is shared between said processor nodes;
   a first processor node that includes a data block and a coherence directory for said data block in an associated memory module;
   a second processor node that includes a copy of said data block in a memory module associated with the second processor node, said copy of said data block residing exclusively in said memory module;
   a third processor node that encounters a read or write miss of said data block and requests said data block from the first processor node; and
   wherein said first processor node receives the request for the data block from the third processor node, forwards the request to the second processor node for the data block and performs a speculative write of the next directory state to the coherence directory for the data block without waiting for the second processor node to respond to the request, said next directory state selected to reduce read-modify-write sequences.

6. The distributed multiprocessing computer system of claim 5, wherein the speculative write of the next directory state occurs only if the next directory state cannot be determined and the first processor node and second processor node are two different processor chips in the computer system.

7. The distributed multiprocessing computer system of claim 5, wherein the memory module containing the coherence directory for the data block is in a low latency state that reduces memory read and write access times while the first processor node is performing the speculative write of the next directory state to the coherence directory for the data block.

8. The distributed multiprocessing computer system of claim 5, further comprising correcting the next directory state for the data block if the response by the second processor node to the first processor node request for the data block indicates a different next directory state from the next directory state speculatively written by the first processor node to the coherence directory for the data block.

9. The distributed multiprocessing computer system of claim 5, wherein the speculative write of the next directory state releases hardware contained in the first processor node, allowing said first processor node to accept requests for data blocks and coherency directories for said data blocks stored in the memory module of the first processor node.

10. A distributed multiprocessing computer system, comprising:
    a plurality of processor nodes each coupled to an associated memory module, wherein each memory module may store data that is shared between said processor nodes;
    a Home processor node that includes a data block and a coherence directory for said data block in an associated memory module;
    an Owner processor node that includes a copy of said data block in a memory module associated with the Owner processor node, said copy of said data block residing exclusively in said memory module;
    a Requestor processor node that encounters a read or write miss of said data block and requests said data block from the Home processor node;
    wherein said Home processor node receives the request for the data block from the Requestor processor node, forwards the request to the Owner processor node for the data block and performs a speculative write of the next directory state to the coherence directory for the data block without waiting for the Owner processor node to respond to the request; and
    a disk drive coupled to each of said plurality of processor nodes.

11. A method, comprising:
    receiving a request for a data block;
    forwarding the request to an owner node at which an updateable directory state of the data block is stored; and
    speculatively writing the directory state before receiving a coherence response from the owner.

12. The method of claim 11 further comprising re-writing the directory state upon receipt of a coherency response from the owner.

13. The method of claim 11 further comprising confirming the speculatively written directory state upon receipt of a coherency response from the owner.

14. An apparatus adapted to communicate with an owner node that is configured to have an exclusive copy of a data block, the apparatus comprising:
    memory in which a directory table is stored, the directory table including an configurable cache state associated with the data block; and
    a cache controller that speculatively updates the data block's cache state in the directory table upon receiving a memory request and before the apparatus receives a coherence response from the owner node.

15. The apparatus of claim 14 wherein, upon receiving the coherence response from the owner node, the cache controller confirms the speculatively updated cache state if the updated cache state comports with the cache information provided in the coherence response.

16. The apparatus of claim 14 wherein, upon receiving the coherence response from the owner node, the cache controller changes the speculatively updated cache state if the updated cache state does not comport with the cache information provided in the coherence response.

* * * * *

UNITED STATES PATENT AND TRADEMARK OFFICE
CERTIFICATE OF CORRECTION

PATENT NO. : 7,099,913 B1  Page 1 of 1
APPLICATION NO. : 09/652834
DATED : August 29, 2006
INVENTOR(S) : Michael S. Bertone et al.

It is certified that error appears in the above-identified patent and that said Letters Patent is hereby corrected as shown below:

In column 7, line 58, after "127" delete "to".

Signed and Sealed this

Fourteenth Day of July, 2009

JOHN DOLL
*Acting Director of the United States Patent and Trademark Office*